(No Model.) 7 Sheets—Sheet 1.

H. McPHAIL & E. & C. H. SIMPSON.
STEAM GENERATOR.

No. 442,197. Patented Dec. 9, 1890.

Witnesses:
J. A. Rutherford.
Robert Everett.

Inventors,
Hugh McPhail
Edward Simpson
Charles H. Simpson
By James L. Norris.
Atty.

(No Model.) 7 Sheets—Sheet 2.
H. McPHAIL & E. & C. H. SIMPSON.
STEAM GENERATOR.
No. 442,197. Patented Dec. 9, 1890.
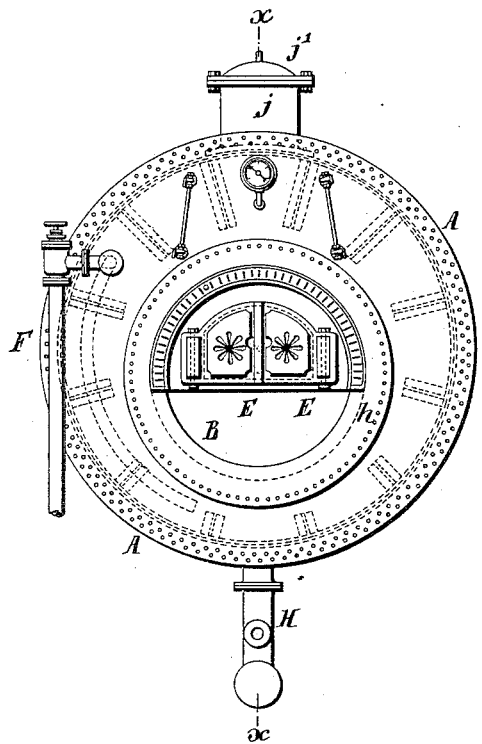
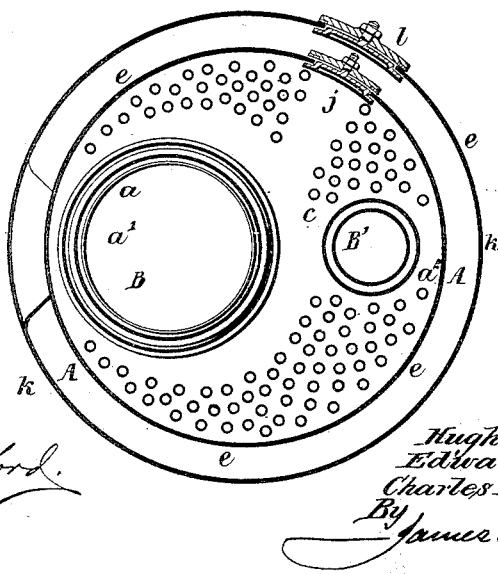
Witnesses
J. A. Rutherford
Robert Ewett
Inventors
Hugh McPhail
Edward Simpson
Charles H. Simpson
By James L. Norris
Atty

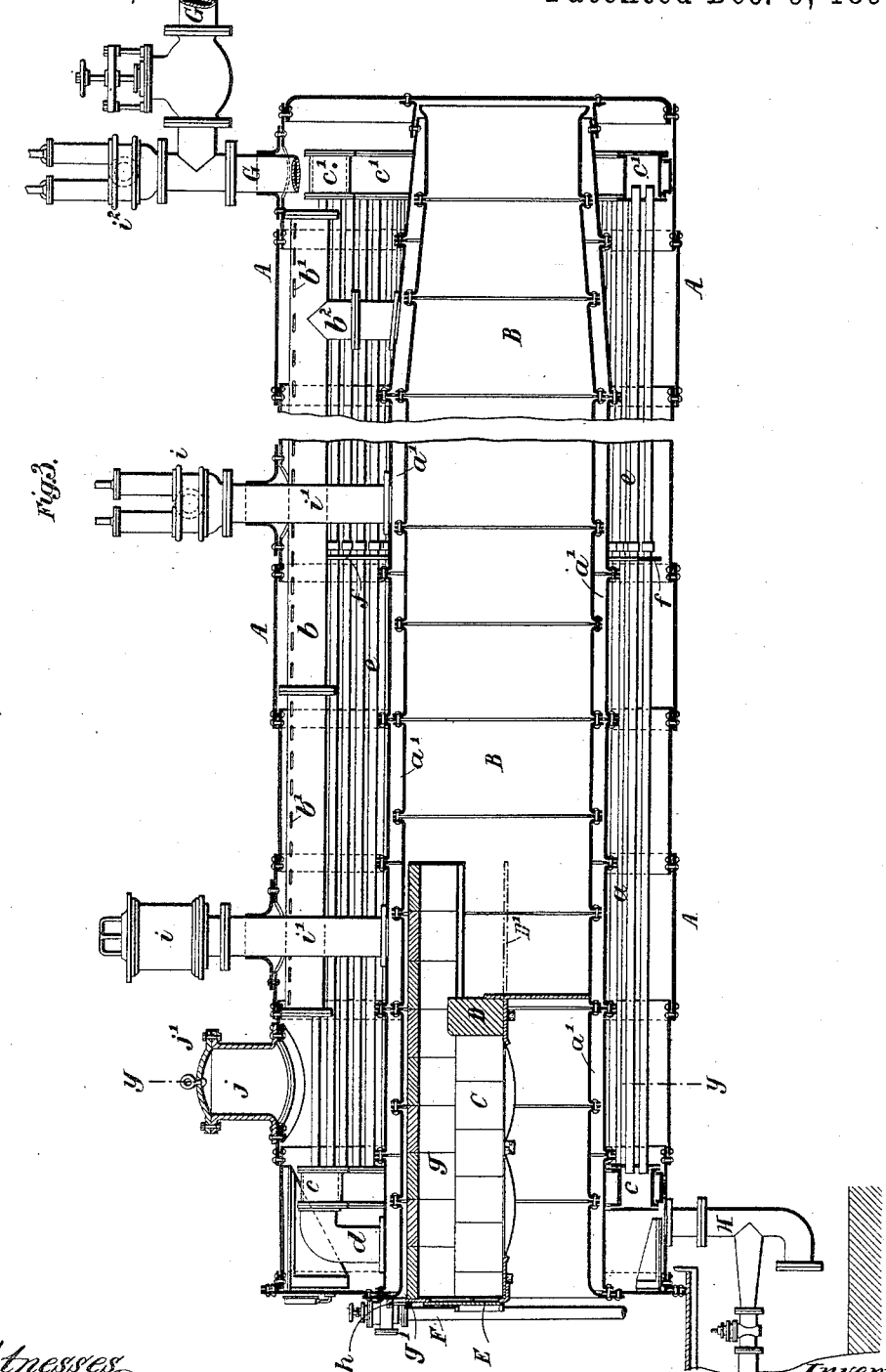

(No Model.) 7 Sheets—Sheet 4.

H. McPHAIL & E. & C. H. SIMPSON.
STEAM GENERATOR.

No. 442,197. Patented Dec. 9, 1890.

Witnesses.
J. A. Rutherford.
Robert Everett.

Inventors
Hugh McPhail
Edward Simpson
Charles H. Simpson
By James L. Norris.
Atty.

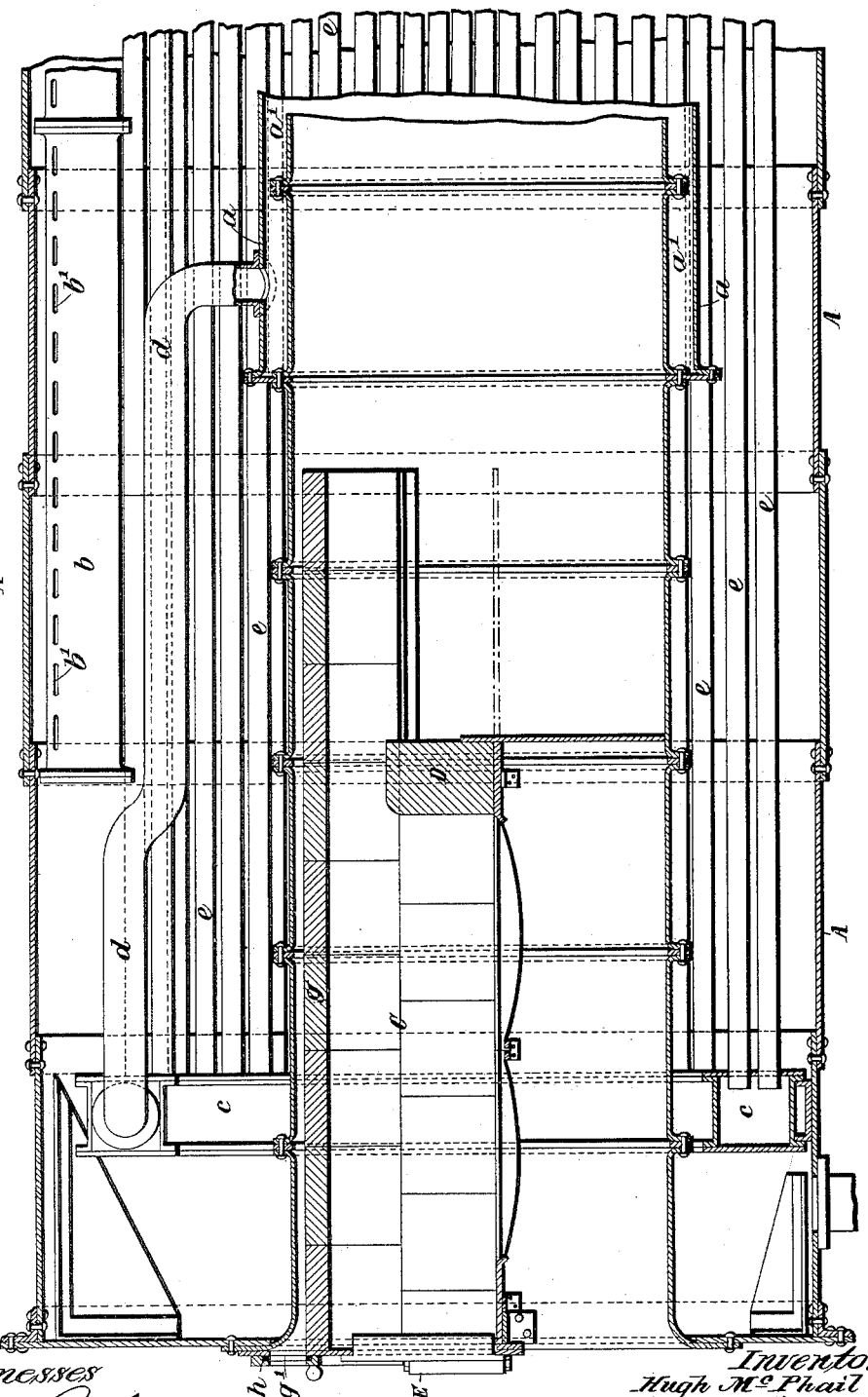

(No Model.) 7 Sheets—Sheet 6.
H. McPHAIL & E. & C. H. SIMPSON.
STEAM GENERATOR.
No. 442,197. Fig.6. Patented Dec. 9, 1890.
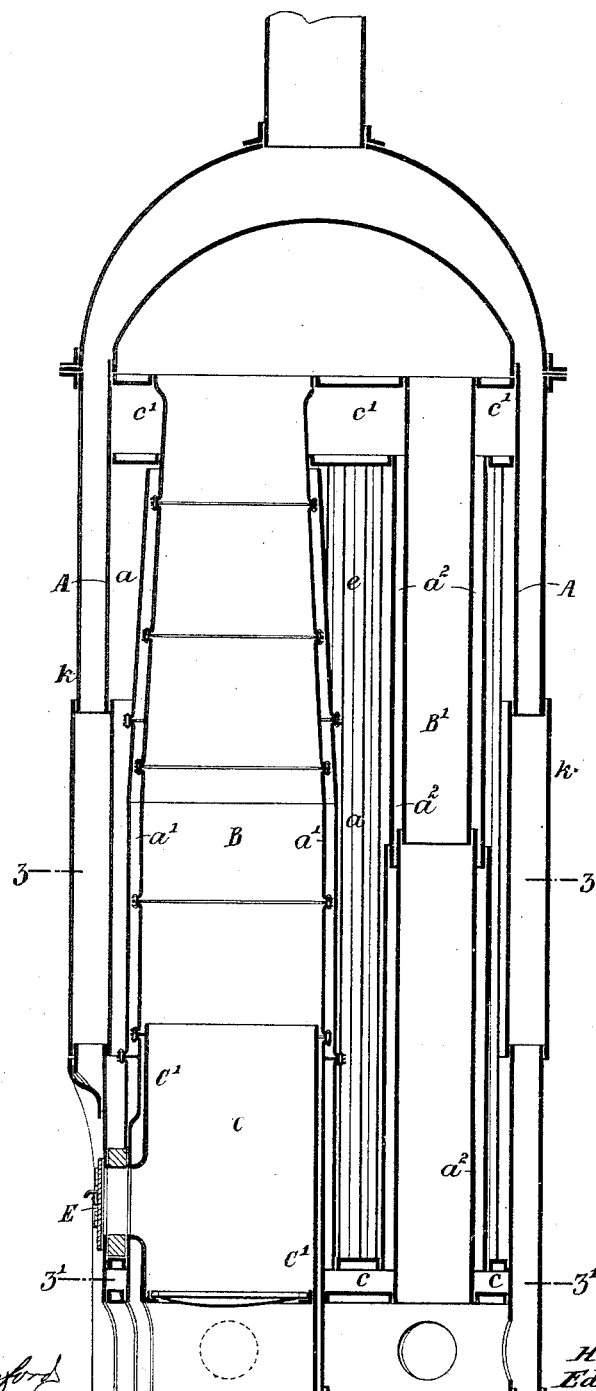
Witnesses
J. A. Rutherford
Robt. Emett
Inventors
Hugh McPhail
Edward Simpson
Charles H. Simpson
By James L. Norris.
Atty

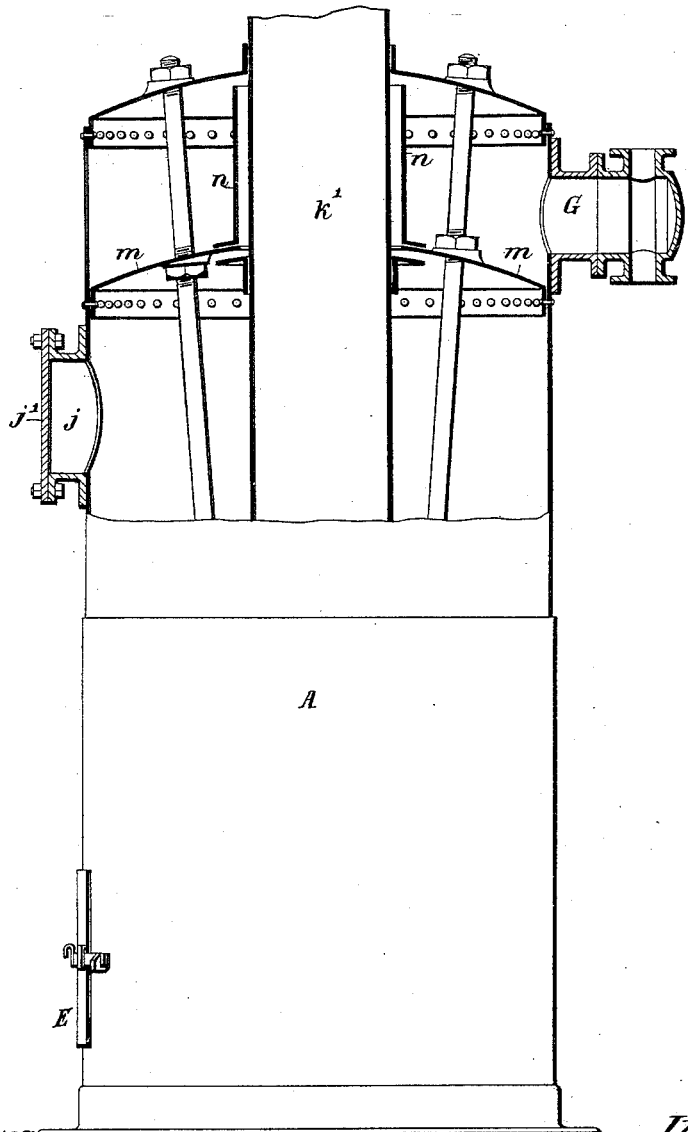

UNITED STATES PATENT OFFICE.

HUGH McPHAIL, OF DUBLIN, IRELAND, AND EDWARD SIMPSON, OF WALTON AND CHARLES H. SIMPSON, OF ACKWORTH, ENGLAND.

STEAM-GENERATOR.

SPECIFICATION forming part of Letters Patent No. 442,197, dated December 9, 1890.

Application filed January 2, 1890. Serial No. 335,684. (No model.)

*To all whom it may concern:*

Be it known that we, HUGH McPHAIL, engineer, a subject of the Queen of Great Britain, and a resident of Dublin, Ireland, and EDWARD SIMPSON, manufacturer, a subject of the Queen of Great Britain, and a resident of Walton, Wakefield, England, and CHARLES HENRY SIMPSON, manufacturer, a subject of the Queen of Great Britain, and a resident of Ackworth, Pontefract, county of York, England, have invented a certain new and useful Improved Method of and Apparatus for Generating Steam, also applicable for evaporating various liquids, of which the following is a specification, reference being had to the accompanying drawings.

Our invention relates to a method of and apparatus for generating steam or evaporating liquids.

The chief feature of our said invention is the utilization of steam superheated or surcharged to a high degree for evaporating or for assisting in or facilitating the evaporation of liquids in a steam-boiler or generator to produce steam under pressure therein.

Our said invention, however, comprises various improvements, which are partly applicable to apparatus for evaporating liquids for other purposes.

In the accompanying drawings we have shown how our said invention may be conveniently and advantageously carried into practice.

Figure 1:
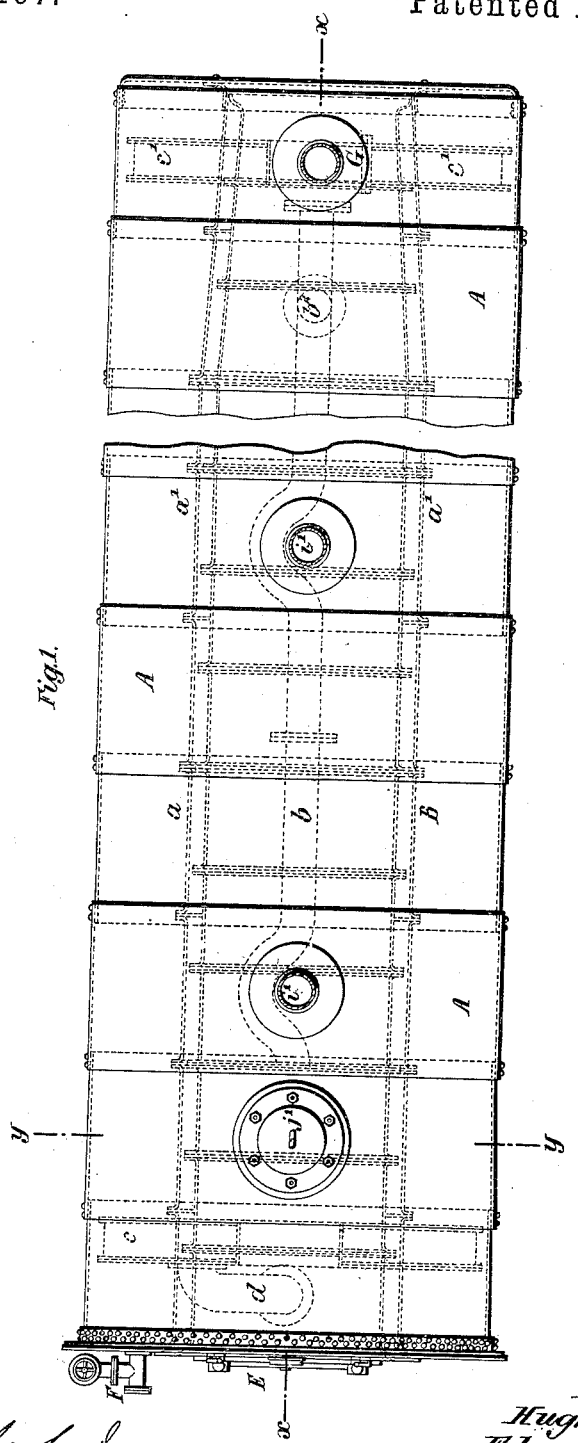
Figure 4:
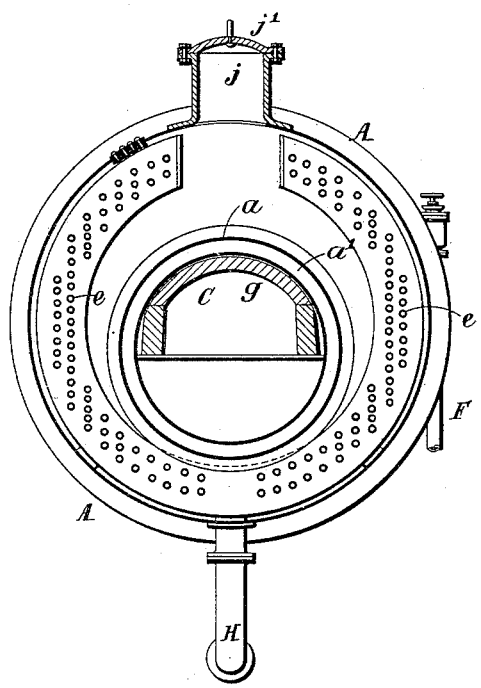

Figure 1 is a plan, and Fig. 2 a front elevation, showing an ordinary single-flue or Cornish boiler with our improvements applied thereto. Fig. 3 is a vertical longitudinal section on the line $x\ x$, Figs. 1 and 2. Fig. 4 is a transverse section on the line $y\ y$, Figs. 1 and 3. Fig. 5 is a vertical longitudinal central section, drawn to an enlarged scale, illustrating a slight modification of the apparatus shown in Figs. 1 to 4. Fig. 6 is a vertical central section; Fig. 7, a horizontal section on the line $z\ z$, Fig. 6; and Fig. 8, a horizontal section on the line $z'\ z'$, Fig. 6, showing a vertical boiler with our improvements applied thereto. Fig. 9 is a side elevation, partly in vertical central section, showing another form or modification of our said invention, which we prefer to employ when the steam is only required to be slightly superheated or dried.

Like letters indicate corresponding parts throughout the drawings.

A is the shell of the boiler. B is the central or main flue thereof.

C is the furnace.

D is the bridge.

E E are the furnace-doors.

F is the pipe for supplying feed-water to the boiler.

G is the pipe whereby the steam generated in the said boiler is conducted therefrom.

H is the blow-off pipe.

$a$ is a jacket or casing which surrounds the flue B, so as to form an annular space or chamber $a'$, and which in the boiler shown in Figs. 1 to 4 extends the entire length of the said flue.

$b$ is a pipe situated in the ordinary steam-space of the boiler and having longitudinal slots or slits $b'$, or other suitably-shaped apertures, for the admission of steam from the said steam-space. This pipe $b$ is connected by means of a branch or connecting pipe $b^2$ with the upper part of the annular space or chamber $a'$ at the end thereof farthest from the face or front of the boiler.

$c\ c'$ are chambers extending nearly but not quite around the casing $a$ at a suitable distance therefrom, and supported upon angle-irons provided in the bottom of the boiler, or in any other convenient manner. The chamber $c$ is in free communication through a pipe $d$ with the annular space or chamber $a'$, and the chamber $c'$ is connected to the steam-pipe G. The annular space or chamber $a'$ and the steam-pipe G are preferably connected to the chambers $c\ c'$ at opposite extremities of the said chambers—that is to say, the end of the chamber $c$ on one side of the center of the boiler is connected with the pipe $d$ and the end of the chamber $c'$ on the other side of the center of the boiler is connected with the steam-pipe G. The said chambers $c\ c'$, moreover, communicate with each other through tubes $e$, of steel or other suitable material, situated partly in the water-space and partly in the steam-space of the boiler. $f$ is a perforated annular plate or diaphragm for supporting the tubes $e$ midway between their ends.

The furnace C is provided with an arch $g$, formed of fire-bricks, fire-clay, or other suitable material, and extending a short distance beyond the fire or beyond the bridge or check D. The said arch $g$ is so constructed as to leave a narrow space or clearance between its upper surface and the interior surface of the flue B. Suitable apertures $g'$ are provided for admitting air from the exterior of the boiler into this space. The air passing through the said space between the arch and the interior surface of the flue B is first warmed, and is then delivered into the flue at the rear of the fire.

In some instances we do not use the bridge or check D at rear of the fire, but we place a platform or plate D' in line with the fire and extending back about three feet or other convenient distance under the arch $g$, as indicated by dotted lines in Figs. 3 and 5. This platform may be constructed of fire-clay, cast-iron, or other suitable material, and serves the purpose of maintaining the heat during the cleaning of the furnace and of facilitating that operation by enabling the stoker or fireman to push back upon the said platform a portion of the fire previous to cleaning the furnace. By providing the arch, moreover, we obviate the liability to overheating of the crown of the flue in the combustion-chamber.

$h$ is an adjustable plate or shutter for regulating the admission of air through the apertures $g'$ by opening or closing the said apertures more or less, as required.

$i\ i$ are safety-valves connected by means of pipes $i'$ with the annular space or chamber $a'$. $i^2$ is a safety-valve connected with the chamber $c'$ through the steam-pipe G.

$j$ is a man-hole provided with a suitable door or cover $j'$. The necessary water-gages, steam-pressure gages, stop-cocks or valves, and other usual boiler fittings are, moreover, provided.

In working our improved boiler or steam-generator we prefer to employ pyrometers for ascertaining the degree of heat attained by the steam in the annular space or chamber $a'$ and the temperature in the combustion-chamber C. We arrange the said pyrometers in the chamber $a'$, or in the combustion-chamber C, or in both of these chambers, in such a manner that the indicating portions of the pyrometers can be readily observed.

The operation of the improved boiler or steam-generator is as follows—that is to say, the said boiler having been filled with water to the proper level in the usual manner, the fire is lighted in the furnace or combustion-chamber C and is at first kept rather low. This is more especially necessary if the feed-water is introduced at a low temperature. If, however, the feed-water is at a high temperature and passes off vapor, the fire can be allowed to burn freely and greater heat be generated in the furnace. If the space or chamber $a'$ is filled or partially filled with water at the beginning of the operation, or if a small jet of water is turned upon the top of the flue in the chamber $a'$ while the flue-plates are at a moderate temperature, this water will pass into steam and assist in the rapid elevation of temperature throughout the boiler. As soon as steam is generated in the boiler it passes through the apertures $b'$ into the pipe $b$ and through the connecting-pipe $b^2$ into the space or chamber $a'$ around the flue B, wherein it becomes highly superheated or surcharged. This superheated or surcharged steam then passes through the pipe $d$ into the annular chamber $c$, and from the latter through the tubes $e$ to the chamber $c'$, whence it may be conducted through the steam-pipe G for use in a steam-engine or for other purposes. The highly superheated or surcharged steam while contained in or passing through the space or chamber $a'$, the chambers $c\ c'$, and tubes $e$ communicates a portion of its heat by radiation to the water in the boiler and assists in converting the water into steam, and also slightly superheats or dries the steam contained in the ordinary steam-space of the boiler. The feed-water is preferably introduced into the boiler at a high temperature.

Should the degree of heat attained by the steam in the space or chamber $a'$ or in the combustion-chamber C become excessive, the attendant can ascertain this fact by observing the pyrometers, and the temperature may be reduced by checking the admission of air to the combustion-chamber or furnace and by means of the dampers, and thus lowering the fire therein.

In the modification of our invention shown in Fig. 5 the jacket or casing $a$ is omitted from that portion of the flue around the combustion-chamber or furnace, thereby permitting the water to surround this portion of the flue. This arrangement is advantageously applicable to boilers having the ordinary arrangement of combustion-chamber or furnace.

Figure 8:
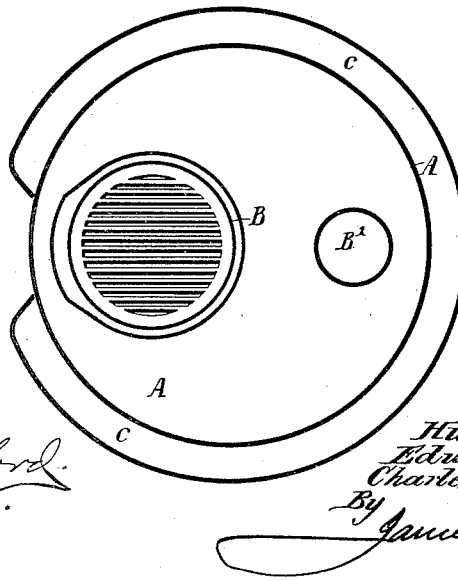

Figs. 6, 7, and 8 illustrate our said invention applied to a vertical boiler. In this boiler the products of combustion after passing up the main flue B return by means of a second flue B' and again pass upward through an annular space between the shell A of the boiler and an external casing $k$ provided around the said shell to the uptake or chimney $k'$, which is carried by the said casing, or another internal flue may be provided as an uptake to the chimney. The furnace C is provided with an internal tube or casing C', which serves to protect the plates of the flue B from the action of the heat, and which may be lined with fire-brick or fire-clay. A jacket or casing $a$ and an annular space or chamber $a'$ surround the combustion or furnace flue. The said space or chamber communicates at its upper end with the ordinary steam-space of the boiler and at its lower end with the chamber $c$.

$a^2$ is an annular space surrounding the flue B' and communicating with the chambers $c\ c'$.

Tubes $e$ are also provided for connecting the chambers $c$ and $c'$, and the steam intended for use is conducted from the boiler by means of a suitable steam-pipe connected with any convenient part of the upper chamber $c'$ and having connected therewith a suitable safety-valve.

$l$ is a man-hole provided in the casing $k$ to permit access to the man-hole $j$ of the boiler. The upper portion or crown of the said casing $k$ and that of the boiler-shell A are preferably so constructed as to be readily removable, or are provided with convenient man-holes to facilitate the cleaning or repair of the said boiler.

In some instances the jacket or casing $a$ is omitted from that portion of the combustion or furnace flue surrounding the fire, and the steam is carried down to the chamber $c$, as described with reference to Fig. 5.

When it is only required to dry or slightly superheat the steam in the boiler, we increase the capacity of the said boiler and form a partition or diaphragm above the usual steam-space. This partition divides the entire steam-space, and thus forms a chamber in the interior of the said boiler in which the steam will be dried or slightly superheated. In Fig. 9 we have shown how an arrangement of this kind may be advantageously applied to a vertical or upright boiler with vertical or cross tubes. The shell of the boiler is formed considerably higher than is usual for a boiler of the same capacity.

$m$ is a partition or diaphragm preferably formed of thinner plate than the shell of the boiler, and secured in the latter at about the same height as that usually occupied by the top plate. To the partition or diaphragm $m$ is attached a casing $n$, which extends upward for a suitable distance around the uptake $k'$, thus forming a steam-space between the said uptake and casing. The steam generated in the boiler passes to the usual steam-space above the water-level and beneath the partition or diaphragm $m$, and thence through the said space between the casing $n$ and uptake $k'$ to the extra steam-space provided above the said partition or diaphragm. While passing through this space the said steam is advantageously dried by contact with the hot plates of the uptake and is slightly superheated or surcharged. This arrangement, moreover, effectually prevents priming. The said arrangement may by obvious modifications be adapted to other descriptions of boilers.

The improved steam boiler or generator hereinbefore described will be highly economical in use, as a comparatively small amount of fire in the furnace or combustion-chamber is sufficient to highly superheat or surcharge the steam circulating through the chamber around the flue, and to raise the said steam to a high degree of temperature, and the said steam passing through the above-mentioned tubes and chambers communicates this extra heat to the water, a very large heating-surface being thus provided. Moreover, the degree to which the steam is superheated or surcharged when leaving the said steam boiler or generator can be regulated as desired, and by the intervention of the said jacket or casing around the flue explosions from shortness of water are prevented.

In some instances we provide in the annular space or chamber around the flue spiral or helical convolutions of angle-iron, T-iron, or metal bars of other suitable form in transverse section. These angle-irons or bars are riveted to the said jacket or casing, but not to the flue. They therefore do not interfere with the expansion or contraction of the said flue, while they act to cause the steam passing through the said annular space or chamber to circulate around the said flue.

We sometimes provide a jacket or casing around the exterior of the shell of the boiler, or around a portion thereof, into which casing the superheated or surcharged steam from the annular space or chamber around the flue may be passed before being conducted away from the boiler through the steam-pipe.

We find it advantageous in some cases to divide the said annular space or chamber into two parts and employ one part thereof for superheating or surcharging the steam intended for evaporating purposes and the other part thereof for again superheating or surcharging the said steam after it has been so employed before it is removed for the purpose of being utilized in any other desired manner.

In some instances we employ a set or battery of boilers, the water and steam spaces of which are connected in any convenient manner. One of the said boilers only is provided with a furnace or combustion-chamber, (or the said furnace may be independent of any of them,) and the flue therefrom passes through the other boilers so as to thoroughly utilize the waste products of combustion. The superheated or surcharged steam from the chamber provided around this furnace or combustion-chamber is carried through the water-spaces or partly through the water-spaces and partly through the steam-spaces of the said boilers in pipes, coils, or casings or in any other suitable manner, for the purpose hereinbefore described.

The steam which we use for evaporating liquid in a boiler or generator to produce steam under pressure therein can, if desired, be superheated in a furnace or flue separate from the said boiler.

It is obvious that our improvements are also applicable to two-flued or Lancashire boilers, multi-tubular or locomotive boilers, and to other descriptions of horizontal and vertical boilers. It is evident, moreover, that we can somewhat further modify the construction of our apparatus without departing from the nature of our said invention. For instance, the jacket or casing, instead of extending throughout the entire length of the flue or being omitted over that portion of the flue forming the combustion-chamber or furnace, as hereinbefore described, may extend over or be omitted from any other portion thereof, or the furnace may be placed under the boiler and the combustion-gases passed through the jacketed or cased flue or flues and side and top flues.

Instead of the longitudinal tubes hereinbefore described, we sometimes employ a coil, one extremity of which is connected to the annular space or chamber around the central or main flue or to the chamber connected therewith and the convolutions whereof surround the said flue at a convenient distance therefrom, and are situated in the water-space or partly in the water-space and partly in the steam-space of the boiler. The other extremity of this coil extends through the shell of the boiler at the rear end thereof and is connected to the supply-pipe for conducting the steam generated by the said boiler to the engine or elsewhere; or the said pipe may return along the steam-space of the boiler and extend through any other convenient part of the shell of the latter; or it may be passed through the flue or any portion of the flue for the purpose of again drying or superheating or surcharging the said steam to any desired degree. When the jacket or casing does not extend throughout the entire length of the flue, that portion of the said flue not surrounded by the said jacket or casing is preferably provided with Galloway or other cross-tubes.

Our improved apparatus can, if desired, be used for evaporating liquids for purposes other than the production of steam.

What we claim is—

1. The method of utilizing superheated steam in a boiler for imparting heat to the water therein, which consists in passing the generated steam along an annular chamber located between the flue and the water-space and back again through pipes located in the water-space, substantially as described.

2. The combination, with the combustion-chamber, the flue extending from the rear thereof and the water-space, of a steam-jacket surrounding said chamber and flue but inside the water-space, and forming a steam-superheating chamber, substantially as described.

3. The combination, with a flue of a boiler and a steam-jacket around said flue within the boiler, of chambers connected with each other by suitable tubes and communicating one with said jacket and the other with the steam-pipe, substantially as described.

4. The combination, with the fire-chamber, the flue leading therefrom, and the inner boiler-shell surrounding both and having a space or chamber between it and the top of the fire-chamber opening into the flue, of a perforated plate in the front of the boiler and an adjustable shutter for admitting and regulating the admission of air to the rear of the combustion-chamber, substantially as described.

In testimony whereof we have hereunto signed our names in the presence of two subscribing witnesses.

H. McPHAIL.
EDWARD SIMPSON.
CHARLES H. SIMPSON.

Witnesses:
J. WIGGLESWORTH,
T. R. WILSON,
*Both of Calder Soap Works, Wakefield.*